US011711341B2

(12) United States Patent
Flaus

(10) Patent No.: US 11,711,341 B2
(45) Date of Patent: Jul. 25, 2023

(54) SYSTEM FOR SECURING A CYBER-PHYSICAL METHOD

(71) Applicant: Université Grenoble Alpes, Saint-Martin-d'Héres (FR)

(72) Inventor: Jean-Marie Flaus, Tullins (FR)

(73) Assignee: Université Grenoble Alpes, Saint-Martin-d'Héres (FR)

( * ) Notice: Subject to any disclaimer, the term of this patent is extended or adjusted under 35 U.S.C. 154(b) by 64 days.

(21) Appl. No.: 17/050,769

(22) PCT Filed: Apr. 24, 2019

(86) PCT No.: PCT/FR2019/050970
§ 371 (c)(1),
(2) Date: Oct. 26, 2020

(87) PCT Pub. No.: WO2019/207251
PCT Pub. Date: Oct. 31, 2019

(65) Prior Publication Data
US 2021/0099423 A1   Apr. 1, 2021

(30) Foreign Application Priority Data
Apr. 25, 2018   (FR) ........................................ 1853618

(51) Int. Cl.
*H04L 29/06*   (2006.01)
*H04L 9/40*   (2022.01)
(Continued)

(52) U.S. Cl.
CPC .......... *H04L 63/02* (2013.01); *G05B 19/4184* (2013.01); *G06F 21/31* (2013.01);
(Continued)

(58) Field of Classification Search
CPC ........ H04L 63/02; H04L 12/66; H04L 63/08; H04L 63/102; G05B 19/4184; G06F 21/31
(Continued)

(56) References Cited

U.S. PATENT DOCUMENTS 9,697,355 B1 *   7/2017   Park ...................... G06F 21/554
10,019,677 B2 *   7/2018   Gill ...................... G06Q 10/067
(Continued)

FOREIGN PATENT DOCUMENTS

WO   2019207251 A1   10/2019

OTHER PUBLICATIONS

Foreign Communication from a Related Counterpart Application, International Search Report dated Oct. 2, 2019, International Application No. PCT/FR2019/050970 filed on Apr. 24, 2019.
(Continued)

*Primary Examiner* — Saleh Najjar
*Assistant Examiner* — Peiliang Pan

(57) ABSTRACT

The invention relates to an industrial system comprising machines, systems for controlling machines connected by a first communication network, and a gateway intended to connect the first communication network to a second communication network. The gateway comprises a memory and
(Continued)

comprises a processor configured to copy to the memory first data transmitted over the second communication network and relating to the operation of the machines.

7 Claims, 7 Drawing Sheets

(51) Int. Cl.
   *G05B 19/418* (2006.01)
   *G06F 21/31* (2013.01)
   *H04L 12/66* (2006.01)

(52) U.S. Cl.
   CPC .............. *H04L 12/66* (2013.01); *H04L 63/08* (2013.01); *H04L 63/102* (2013.01); *H04L 63/1425* (2013.01); *G05B 2219/31228* (2013.01); *H04L 2463/082* (2013.01)

(58) Field of Classification Search
   USPC .......................................................... 726/12
   See application file for complete search history.

(56) References Cited

U.S. PATENT DOCUMENTS

| | | | |
|---|---|---|---|
| 10,104,098 B2* | 10/2018 | Baxley | H04B 1/0064 |
| 2014/0137257 A1* | 5/2014 | Martinez | H04L 63/1433 |
| | | | 726/25 |
| 2016/0087958 A1* | 3/2016 | Luo | H04L 63/0209 |
| | | | 713/168 |
| 2017/0093700 A1* | 3/2017 | Gilley | H04L 45/44 |
| 2017/0359366 A1* | 12/2017 | Bushey | H04L 67/10 |
| 2018/0191766 A1* | 7/2018 | Holeman | H04L 63/20 |
| 2018/0212980 A1* | 7/2018 | Oyamada | H04L 63/1425 |
| 2019/0014137 A1* | 1/2019 | Du | G06N 3/0427 |
| 2019/0089725 A1* | 3/2019 | Anachi | G06N 20/00 |
| 2019/0342311 A1* | 11/2019 | Muddu | G06F 3/04842 |
| 2021/0273953 A1* | 9/2021 | Fellows | G06N 5/04 |

OTHER PUBLICATIONS

Foreign Communication from a Related Counterpart Application, Written Opinion dated Oct. 2, 2019, International Application No. PCT/FR2019/050970 filed on Apr. 24, 2019.

* cited by examiner

SYSTEM FOR SECURING A CYBER-PHYSICAL METHOD

CROSS-REFERENCE TO RELATED APPLICATIONS

The present application is a filing under 35 U.S.C. 371 as the National Stage of International Application No. PCT/FR2019/050970, filed Apr. 24, 2019, entitled "SYSTEM FOR SECURING A CYBER-PHYSICAL METHOD," which claims priority to French Application No. 1853618 filed with the Intellectual Property Office of France on Apr. 25, 2018, both of which are incorporated herein by reference in their entirety for all purposes.

FIELD

The present application relates to an industrial system comprising a gateway connecting an operational technology network and an information technology network.

DESCRIPTION OF THE PRIOR ART

An industrial system generally comprises machines and an operational technology network, also called OT network, in particular comprising systems for controlling machines connected in a network. For some applications, it is desirable to be able to intervene remotely on the OT network. For this purpose, it is necessary to log into the computer communication network of the industrial system. This opens a significant breach for the security of the industrial system.

It is known to use a gateway connecting the OT network to an information technology network or IT network, external to the industrial system and generally comprising a router provided with a firewall. A drawback of such a gateway is that when same authorises access to the OT network, same provides full access to the equipment of the OT network whereof the addresses have been authorised. If the remote station of the IT network has been corrupted, it may then be difficult to prevent a malicious action from being performed against the OT network.

SUMMARY

An aim of one embodiment is to prevent direct access of an IT network, external to an industrial system, to the equipment of the OT network of the industrial system.

Another aim of one embodiment is to perform a filtering of the data packets transiting between the IT network and the OT network.

Another aim of one embodiment is to trace the information exchange activities passing through the gateway.

Another aim of one embodiment is to detect the information exchange activities passing through the gateway.

Thus, one embodiment provides an industrial system comprising machines, systems for controlling machines connected by a first communication network and a gateway intended to connect the first communication network to a second communication network, the gateway comprising a memory and comprising a processor configured to copy to the memory first data transmitted over the second communication network and relating to the operation of the machines, further comprising an analyser configured to:
collect values of variables relating to the operation of the machines (14),
determine, for at least some of the variables, ranges of values from at least one first operational model of the machines,
detect at least one anomaly, if the value of at least one variable is outside of the range of values of said variable, said anomaly having a likelihood,
detect, from the at least one anomaly, at least one undesirable event, to which is allocated an impact on the industrial system, said impact having a severity,
determine, for each impact allocated to each of the at least one undesirable event, a likelihood, from a combination of likelihoods of the at least one anomaly detected,
provide, for each impact and the severity-likelihood combination thereof, a numerical value,
determine an overall risk level of the industrial system from the numerical values obtained of the impacts of the at least one undesirable event detected.

According to one embodiment, the first data are provided by the control systems.

According to one embodiment, the processor is configured to write in the memory second data provided by a station connected to the second communication network.

According to one embodiment, the processor is configured to transmit to at least one of the control systems the second data written in the memory.

According to one embodiment, the processor is configured to perform an authentication of a user of said station implementing two distinct identification methods.

According to one embodiment, the analyser is configured to emit an alert if at least one first anomaly is detected and if first conditions are met.

According to one embodiment, the system comprises at least one network sensor configured to make a copy of third data circulating over the first communication network and connected to the analyser.

According to one embodiment, the analyser is configured to determine, for each range of values of a variable, a credibility coefficient and so not to take into account a first anomaly relating to a variable whereof the credibility coefficient of the associated range of values is below a threshold.

According to one embodiment, the analyser is configured to receive the third data, in order to classify the third data according to at least first and second categories, and in order to determine at least the first model from the third data of the first category and a second model from the third data of the second category.

BRIEF DESCRIPTION OF THE DRAWINGS

These features and advantages, as well as others, will be described in detail in the following description of particular embodiments given by way of non-limiting examples in relation to the appended drawings among which.

DETAILED DESCRIPTION

The same elements have been designated by the same references in the various figures and, in addition, the various figures are not drawn to scale. In the interest of clarity, only the elements useful for understanding the embodiments described have been shown and are described in detail. Particularly, the data transmission protocols over a computer communication network are well known by the person skilled in the art and are not subsequently described in detail. Unless otherwise specified, the expressions "approximately", "substantially", "around" and "in the order of" mean to the nearest 10%, preferably to the nearest 5%.

Figure 1:
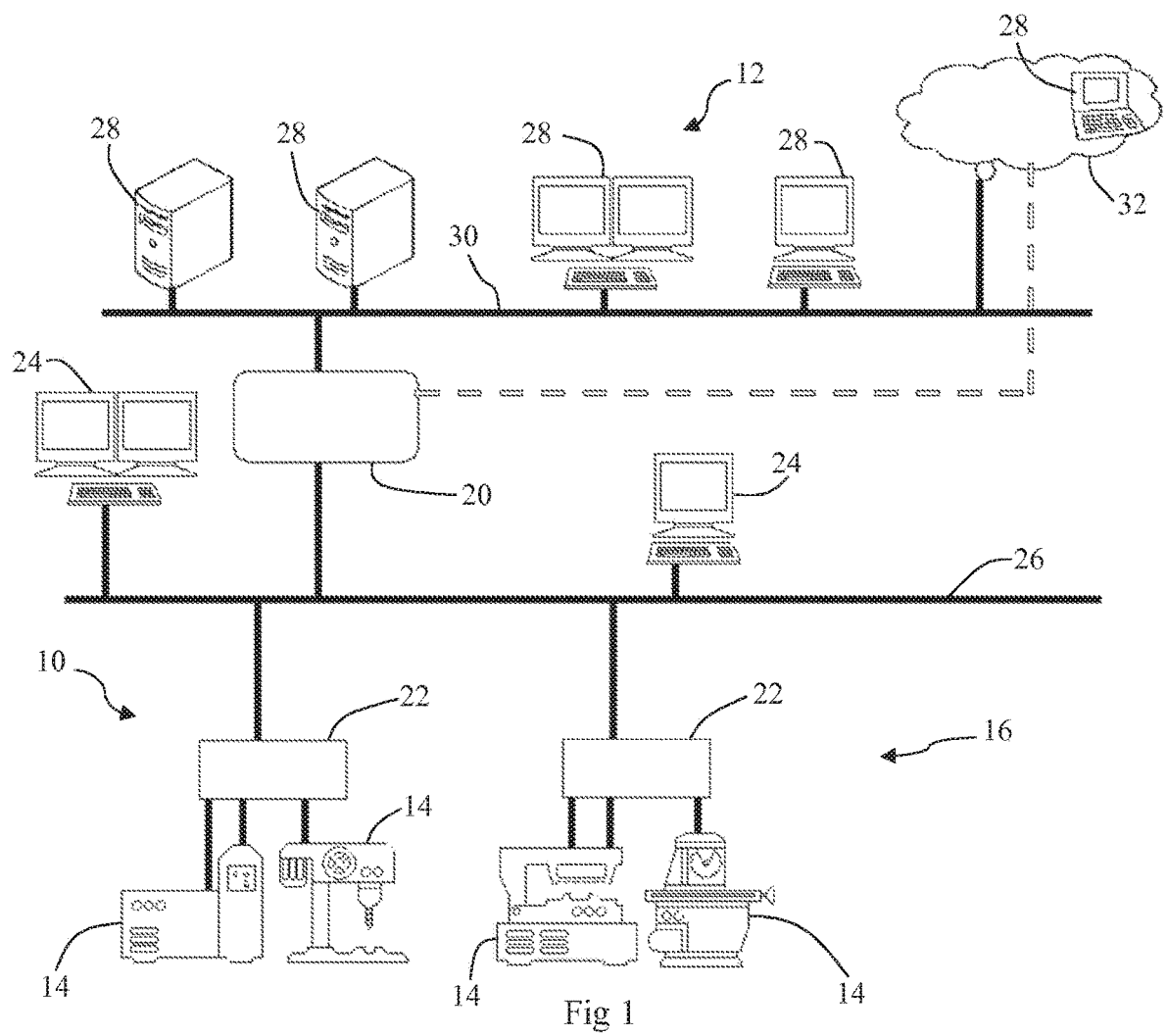
FIG. 1 shows, partially and schematically, one embodiment of an industrial system connected to an IT network.

FIG. 1 shows, partially and schematically, one embodiment of an industrial system 10 connected to an IT network 12. The industrial system 10 comprises:

machines 14;

an OT network 16 that comprises all of the hardware and software that make it possible to directly monitor and/or control machines 14; and a gateway 20 in particular making it possible to exchange data between the OT network 16 and the IT network 12.

The OT network 16 in particular comprises, for each machine 14, a system for controlling 22 the machine 14, also called controller, for example a Programmable Logic Controller or PLC. Each machine 14 may comprise sensors, actuators, heating elements, etc. The controller 22 is in particular configured to provide, from digital control signals, analogue signals for controlling the machine 14. The controller 22 in particular is configured to provide, from signals measured by the sensors of the machine 14, measurement signals suitable for the OT network 16. The OT network 16 may comprise other computer systems 24 connected to the controllers 22 by means of a communication network 26. The computer systems 24 in particular make it possible to control the machines 14 remotely within the industrial system 10. The OT network 16 may correspond to a data control and acquisition system, also called SCADA (Supervisory Control And Data Acquisition) that is a remote management system for processing remote measurements in real time and controlling the machines 14 remotely. Subsequently, the equipment of the OT network 16 is indifferently called a controller 22 or a computer system 24 of the OT network 16.

The IT network 12 comprises computers 28, also called stations, mutually connected by a communication network 30 and connected to the gateway 20. Particularly, computers 28 may be connected to the gateway 20 via the Internet 32.

Figure 2:
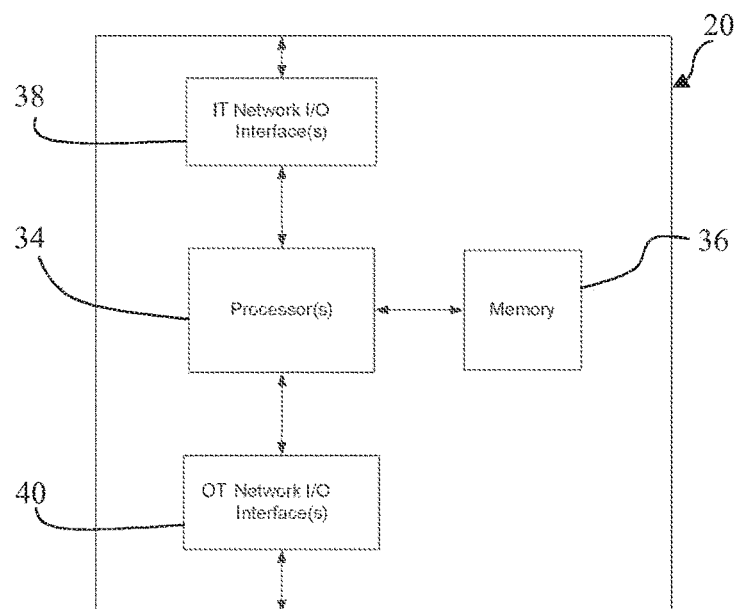
FIG. 2 shows, in the form of a block diagram, one embodiment of a gateway of the industrial system in FIG. 1.

FIG. 2 is a block diagram of one embodiment of the gateway 20. The gateway 20 may comprise one or more Processor(s) 34 and one or more non-transitory storage media readable by a processor (for example, the Memory 36), in particular chosen in the group comprising RAM, ROM, EEPROM, flash memory or another memory technology, CD-ROM, digital versatile disk (DVD) or another optical disk medium, magnetic cassette, magnetic tape, magnetic storage disk or another magnetic storage device, or another non-transitory storage medium readable by computer. The memory 36 may store computer program instructions that, when same are executed, implement the steps of methods subsequently described. The processor or the processors 34 may be coupled to the memory 36 and may execute said computer program instructions to result in the performance of said steps. The gateway 20 may further comprise a first IT Network I/O Interface 38 wherethrough the gateway 20 may communicate with the OT network 16 and a second OT Network I/O Interface 40 wherethrough the gateway 20 may communicate with the IT network 12.

The gateway 20 makes it possible to exchange data between the IT network 12 and the OT network 16. In the remainder of the description, the transmission of orders by the user from a station 28 of the IT network 12 intended for equipment of the OT network 16, for example a controller 22, via the gateway 20 is called remote access to the OT network 16 by a user.

In order to make it possible for a user to access the OT network 16, the gateway 20 is configured to perform an authentication of the user who asks to exchange data with the OT network 16.

Figure 3:
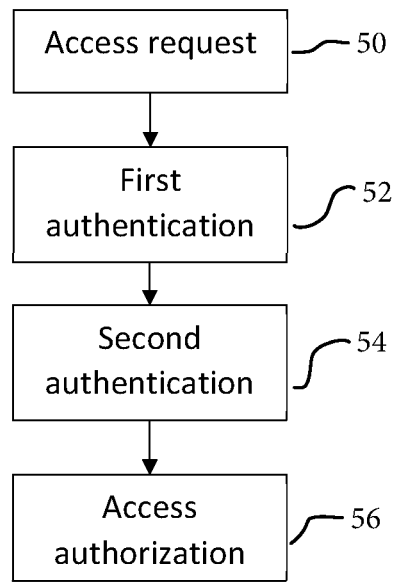
FIG. 3 shows, in the form of a block diagram, one embodiment of an identification method implemented by the gateway of the industrial system in FIG. 1.

FIG. 3 shows, in the form of a block diagram, one embodiment of an authentication method implemented by the gateway 20 of the industrial system 10 in FIG. 1; In step 50, the gateway 20 receives an access request from a user from a station 28 of the IT network 12. The method continues in step 52.

In step 52, the gateway 20 determines whether the user is authorised to access the OT network 16 by using a first criterion for authenticating the user. If the first criterion is met, the method continues in step 54. If the first criterion is not met, the gateway 20 blocks the access of the OT network 16 to the station 28.

In step 54, the gateway 20 uses a second criterion for authenticating the user that is different from the first criterion. If the second criterion is met, the method continues in step 56. If the second criterion is not met, the gateway 20 blocks the access of the OT network 16 to the station 28.

By way of example, the first and second authentication criteria may be chosen in the group comprising:

the transmission by the station 28 of an identifier and/or of a password and the comparison by the gateway 20 of the identifier and/or of the password with a list of authorised identifiers and/or passwords stored in memory; and the request by the user of a code from a trustworthy organisation connected to the IT network 12, the transmission of the code by the trustworthy organisation to the user and the transmission by the user of the code to the gateway 20 by the station 28.

In step 56, the gateway 20 authorises the transmission of data by the user from the station 28 to the OT network 16, for example to one of the controllers 22. According to one embodiment, the access may only be authorised by the gateway 20 towards certain items of equipment of the OT network 16. According to one embodiment, the access is only authorised for a predetermined period, and, in step 56, the gateway 20 interrupts the access of the station 28 to the OT network 16 at the end of the predetermined period.

According to one embodiment, in step 56, after authentication, the gateway 20 implements a method for filtering requests provided by the user via the station 28.

Figure 4:
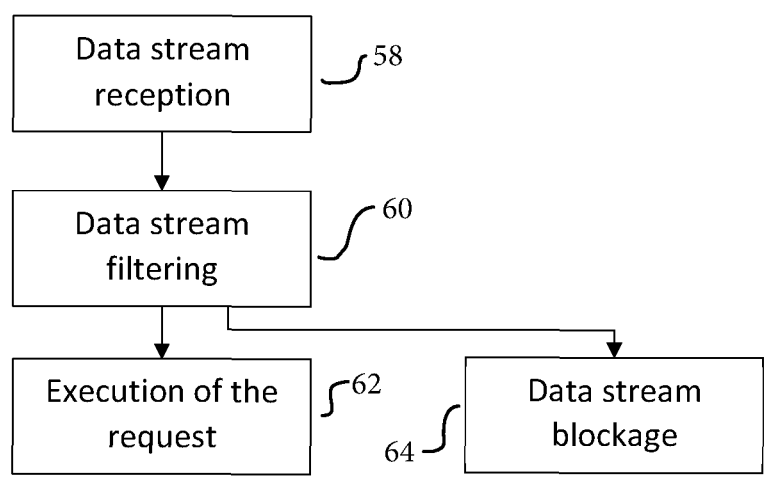
FIG. 4 shows, in the form of a block diagram, one embodiment of a filtering method implemented by the gateway of the industrial system in FIG. 1.

FIG. 4 shows, in the form of a block diagram, one embodiment of a filtering method implemented by the gateway 20 of the industrial system 10 shown in FIG. 1.

In step 58, the station 28 provides a data stream to the gateway 20. The method continues in step 60.

In step 60, the gateway 20 determines whether the data stream is authorised. For this purpose, the processor 34 of the gateway 20 applies rules for authorising or blocking the data stream. It may concern rules that are programmed from the start in the gateway 20. It may further concern rules that are transmitted to the gateway 20, for example rules from a self-learning method such as subsequently described in detail.

According to one embodiment, the processor 34 is configured to determine whether the data stream from the station corresponds to a request that is included in a list of authorised requests. By way of example, the authorised requests may be the following requests:

request to start a machine 14;

request to shut down a machine 14;

request to configure an item of equipment 22, 24 of the OT network 16, in particular to transmit a program that must be executed by the equipment;

request to read data produced by one of the items of equipment 22, 24 of the OT network 16 during the operation of the machines 14, the data corresponding for example to the values of variables, for example to temperature, pressure, voltage, current values, etc., obtained during the operation of one of the machines 14;

request to provide data to one of the items of equipment 22, 24 of the OT network 16, in particular operating commands for one of the machines 14; and request to retrieve maintenance information, for example indicating the occurrence of alerts or of faults.

The list of authorised requests may depend on the user identified by the gateway 20.

If the data stream is authorised, the method continues in step 62. If the data stream is not authorised, the method continues in step 64.

In step 62, the gateway 20 executes an action that depends on the request transmitted. The method goes back to step 58 so long as the access to the OT network 16 is authorised for the station 28.

In step 64, the gateway 20 blocks the data stream provided by the station 28.

According to one embodiment, even after a successful authentication, the station 28 of the IT network 12 does not have direct access to the equipment 22, 24 of the OT network 16 via the gateway 20 to directly read data stored in memories of said equipment 22, 24. Only the reading of data stored in the memory 36 of the gateway 20 is authorised. The processor 34 of the gateway 20 is configured to retrieve data provided by the equipment 22, 24 and to store the retrieved data in the memory 36. The data may be stored in the memory 36 in the form of a table of values accessible via the name of the equipment 22, 24 and of an identifier of the variable associated with the data stored. The data retrieved by the gateway 20 on the OT network 16 and stored in the memory 36 may be updated by the gateway 20 by periodic reading of the data provided by the equipment 22, 24 of the OT network 16. Therefore, when the station 28 transmits to the gateway 20 a request to read data produced by one of the items of equipment 22, 24 of the OT network 16, and that said request is authorised by the gateway 20, the station 28 reads the data sought in the memory 36 of the gateway 20. This may be performed in step 62 described previously.

Furthermore, according to one embodiment, the station 28 does not have a direct access to the equipment 22, 24 of the OT network 16 via the gateway 20 in order to write data directly in memories of said equipment 22, 24. Only the writing of data stored in the memory 36 of the gateway 20 is authorised. Therefore, when the station 28 of the IT network 12 transmits to the gateway 20 a request to transmit data to one of the items of equipment 22, 24 of the OT network 16, and that said request is authorised by the gateway 20, the station 28 writes the data considered in the memory 36 of the gateway 20, for example at a location accessible via the name of the equipment 22, 24 and of an identifier of the variable associated with the data to be written. The processor 34 of the gateway 20 is then configured to read the data written in the memory 36 and to transmit said data to the equipment 22, 24 of the OT network 16 to which said data is intended. This may be performed in step 62 described previously.

According to one embodiment, the gateway 20 is further configured to transmit all or part of the stored table of values of the memory 36 to a station 28 of the IT network 12. The station 28 may query the table of values according to a standard protocol of the IT network 12, for example the https protocol in particular for implementing analysis, consolidation or data display tools of the table of values. Furthermore, it may query the table of values according to an industrial protocol implemented on the OT network 16. A software program may thus operate on the station 28 as if same was operating on the OT network 16.

According to one embodiment, the gateway 20 is further configured to perform a tracing of the information exchange activities between the IT network 12 and the OT network 16. The data exchanged between the IT network 12 and the OT network 16 may be archived in the memory 36 of the gateway 20. Furthermore, the data archived may be classified for example according to the type of requests to which said data correspond. This may be performed in step 62 described previously.

According to one embodiment, the gateway 20 is further configured to implement an intrusion detection method. The gateway 20 may analyse the data streams exchanged between the IT network 12 and the OT network 16 and emit an alert depending on the result of the analysis. The emission of an alert may in particular comprise the transmission of an alert message to the people in charge of the installation. Various alert levels may be provided. For example, low, medium and high alert levels may be provided. A high-level alert may be emitted, in particular in step 64 described previously, when a data stream is blocked by the gateway 20, for example because same corresponds to a request never authorised by the gateway 20. A medium-level alert may be emitted when unsuccessful access attempts are detected, by an attempt to read unauthorised data. A medium-level alert may further be emitted, in particular in step 64 described previously, during the transmission of a request not authorised by the gateway 20 for the user at the origin of the request, same then being blocked by the gateway 20. A low-level alert may be emitted, in particular in step 64 described previously, during the detection of an unusual behaviour of a user even if the request to which the data stream corresponds is permitted.

For some applications, it is desirable to detect the possible malicious attacks on the industrial system 10. For an IT network 12, Intrusion Detection Systems (IDS) exist suitable for analysing the data stream transiting over the communication network 30 of the IT network 12 and/or for analysing operating data of the stations 28 in order to detect characteristic events of a malicious activity. Two approaches may be used: anomaly detection and misuse detection. In anomaly detection, an attack is qualified by the measurement of a sensitive deviation of the system monitored in relation to a reference behaviour, considered to be healthy and defined beforehand. In misuse detection, the intrusion detection system comprises a database of signatures that model the various known attacks. The analysis consists in searching for the occurrence of a characteristic reason of an attack in the data stream received by the intrusion detection system.

A difficulty of known intrusion detection methods according to the previous approaches is to provide the reference behaviour or to build a database of suitable signatures. When the reference behaviour or the database of signatures are not suitable, this may result in the absence of intrusion detection or result in false positives, that is to say the detection of an intrusion while there is no intrusion attempt. The known intrusion detection systems do not have sufficient reliability for use in an industrial system.

An aim of one embodiment is that the intrusion detection system is suitable for an industrial system.

An aim of one embodiment is that the reliability of the intrusion detection system is improved.

Another aim of one embodiment is to determine the importance of an intrusion detected by the intrusion detection system depending on the potential impact thereof on the industrial system.

Figure 5:
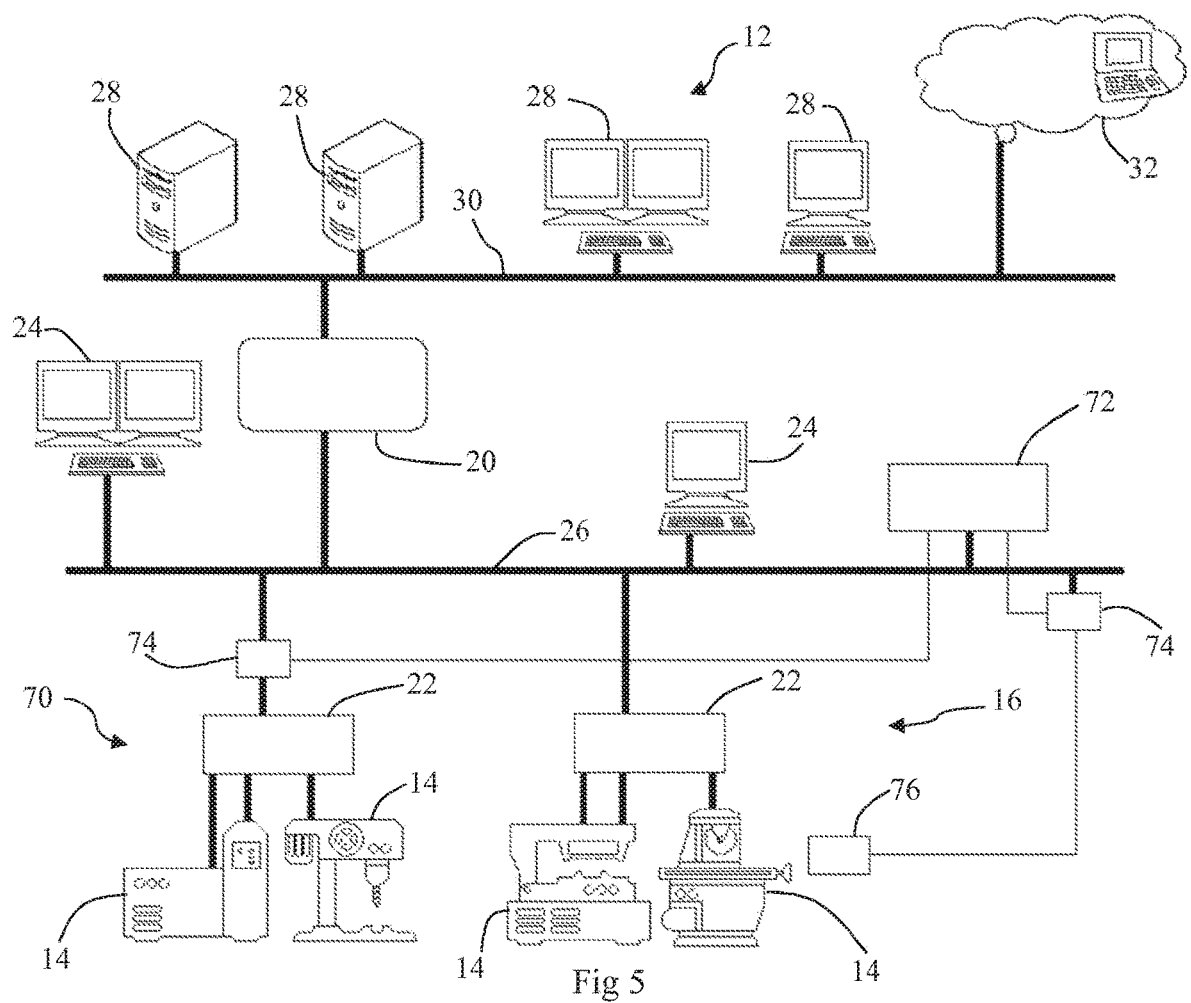
FIG. 5 shows, partially and schematically, another embodiment of an industrial system connected to an IT network.

FIG. 5 shows, partially and schematically, another embodiment of an industrial system 70. The industrial system 70 comprises all of the elements of the industrial system 10 shown in FIG. 1 wherein the OT network 16 further comprises a processing module 72, called analyser in the remainder of the description. The analyser 72 is connected to the communication network 26.

According to one embodiment, the OT network 16 further comprises at least one network sensor 74, also called network probe, connected to the analyser 72, and preferably at least two network sensors 74 connected to the analyser 72. Each network sensor 74 is configured to copy the data stream passing through in a point of the communication network 26 of the OT network 16, optionally to perform a pre-processing of the data steam copied and to transmit the data stream copied and optionally pre-processed to the analyser 72. The network sensor 74 may be provided at a network switch performing a copy or at a network TAP. According to one embodiment, each network sensor 74 develops metadata that are transmitted to the analyser 72.

According to one embodiment, the OT network 16 further comprises at least one machine sensor 76. The machine sensor 76 is associated with a machine 14 and is configured to convert the state of a physical variable observed, for example the temperature, the pressure, etc., likely to vary during the operation of the machine 14 into an electric signal or is configured to measure a signal provided by the controller 22 to the machine 14 or a signal provided by the machine 14 to the controller 22. According to one embodiment, at least one machine sensor 76 is provided for each machine 14. According to one embodiment, at least two machine sensors 76 are provided for each machine 14. The machine sensors 76 depend on the nature of the machine 14 considered. Each machine sensor 76 may be chosen in the group comprising a temperature sensor, a pressure sensor, a rotation sensor, a force sensor, a liquid height sensor or a position sensor. In the present embodiment, each machine sensor 76 is connected to one of the network sensors 74. Alternatively, the machine sensors 76 may be connected directly to the analyser 72.

In the remainder of the description, by considering a controller 22 and a machine 14 controlled by the controller 22:

the digital control signals transmitted via the communication network 26 towards the controller 22 and intended to control the operation of the machine 14 associated with the controller 22 are called set points C;

the digital or analogue control signals provided by the controller 22 to the associated machine 14 are called machine commands U; and signals able to be measured by sensors during the operation of the machine 14 are called machine outputs Y.

The set points C may be read by the network sensors 74 during the transmission thereof over the communication network 26. The machine commands U and the machine outputs Y may be read by the machine sensors 76. Alternatively, for at least one of the machines 14, a machine output Y may be measured by a sensor connected to the machine 14 or to the controller 22 of the machine 14. The controller 22 may then emit over the communication network 26 data representative of the machine output Y that may be copied by a network sensor 74. Similarly, at least one controller 22 may emit over the communication network 26 data representative of a machine command U that the controller 22 has provided to a machine 14 and said data may be copied by a network sensor 74.

According to one embodiment, each network sensor 74 is configured to perform a pre-processing of the data stream copied. The pre-processing may comprise the determination of a local table of values stored in a memory of the network sensor 74. The table of values may comprise values of set points C, of machine commands U, and/or of machine outputs Y determined by the network sensor 74 from an analysis of the data stream copied. When a machine sensor is connected to the network sensor 74, the local table of values stored in the memory of the network sensor 74 may further comprise values of machine commands U or of machine outputs Y determined by the machine sensor 76. Each network sensor 74 is configured to transmit the data stream copied to the analyser 72 and the local table of values thereof.

Figure 6:
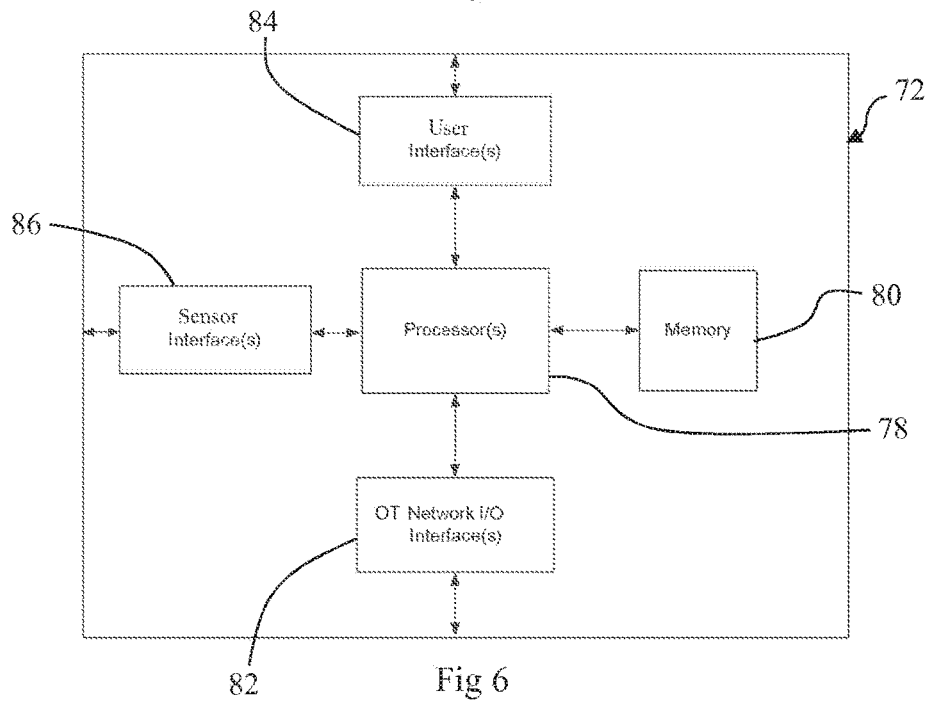
FIG. 6 shows, in the form of a block diagram, one embodiment of an analyser of the industrial system in FIG. 5.

FIG. 6 is a block diagram of one embodiment of the analyser 72. The analyser 72 may comprise one or more Processor(s) 78 and one or more non-transitory storage media readable by a processor (for example, the Memory 80), in particular chosen in the group comprising RAM, ROM, EEPROM, flash memory or another memory technology, CD-ROM, digital versatile disk (DVD) or another optical disk medium, magnetic cassette, magnetic tape, magnetic storage disk or another magnetic storage device, or another non-transitory storage medium readable by computer. The memory 80 may store computer program instructions that, when same are executed, implement the steps of processes subsequently described. The processor or the processors 78 may be coupled to the memory 80 and may execute said computer program instructions to result in the performance of said steps. The analyser 72 may further comprise a first OT Network I/O Interface 82 wherethrough the analyser 72 may communicate with the equipment of the OT network 16. The analyser 72 may further comprise one or more User Interface(s) 84, by means of which the analyser 72 may provide an output signal to a user and receive an input signal coming from the user. The user interfaces may comprise peripherals such as a keyboard, a mouse, a microphone, a display peripheral (for example a monitor or a touchscreen), loudspeakers, a camera, and/or various types of input/output peripheral. The analyser 72 may further comprise one or more Sensor Interface(s) 86 wherethrough the analyser 72 may communicate with the network sensors 74 and/or the machine sensors 76.

Figure 7:
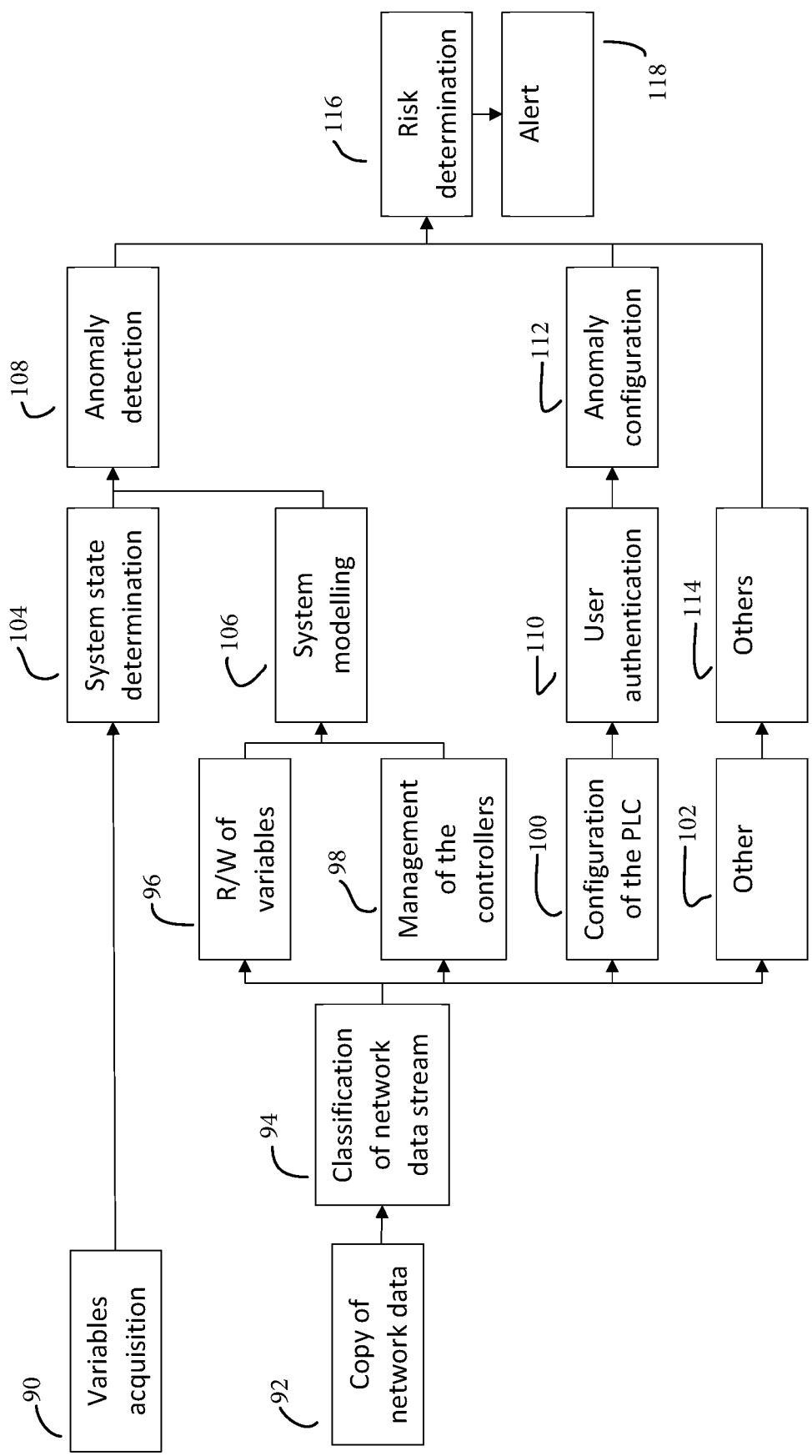
FIG. 7 shows, in the form of a block diagram, one embodiment of an intrusion detection method implemented by the industrial system in FIG. 5.
Figure 8:
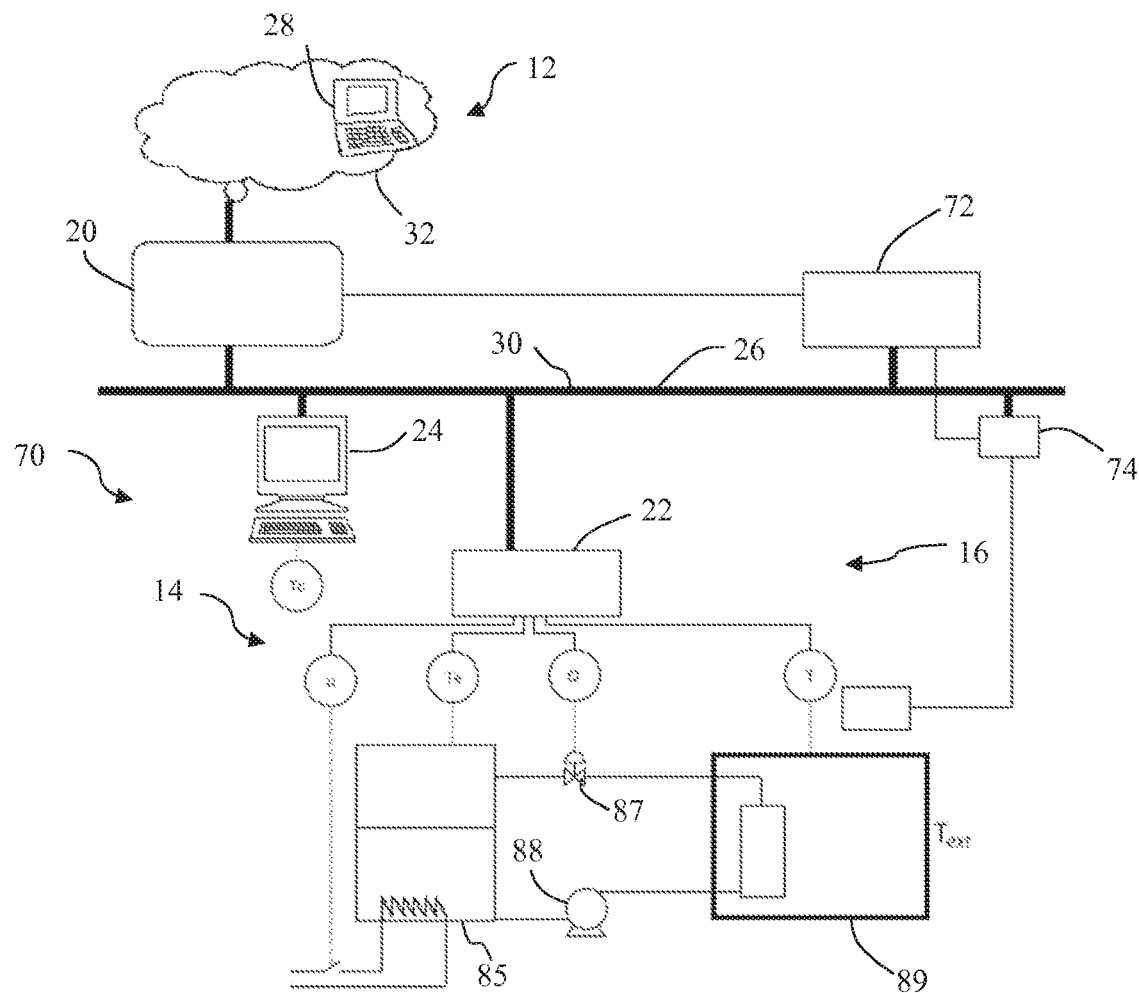
FIG. 8 shows, partially and schematically, an example of an industrial system connected to an IT network.

FIG. 7 shows, in the form of a block diagram, one embodiment of an intrusion detection method implemented by the industrial system 70 in FIG. 5;

FIG. 8 shows a very simplified example of the industrial system 70 connected to the IT network 12 that will be used for illustrative purposes to facilitate understanding of the present embodiment of intrusion detection method. In this example, the industrial system 70 comprises a controller 22, a computer system 24, a network sensor 74 and a machine sensor 76. Furthermore, the machines 14 controlled by the controller 22 comprise a boiler 85, a hydraulic circuit for circulating a heat-transfer fluid heated by the boiler 85 comprising a controllable valve 87 and a pump 88 and an enclosure 89 heated by the heat-transfer fluid.

In the industrial system 70 according to the invention, the analyser 72 may collect values of variables relating to the operation of the machines 14.

For example, again by considering FIG. 7, in step 90, an acquisition of the values of variables of operation of the industrial system, in particular, for each machine 14 and each controller 22, of values of set points C, of machine commands U and of machine outputs Y, is performed by the analyser 72. This may be performed by the transmission by each network sensor 74 of the local table of values thereof to the analyser 72. In the example illustrated in FIG. 8, the computer system 24 provides a temperature set point Tc, the controller 22 provides a command u to the boiler 85 and a command Q to the valve 87 and the measured outputs of the machine 14 correspond to the temperature Te of the boiler 85 and to the temperature T in the enclosure 89.

In step 92, a copy of the data stream transmitted over the communication network 26 of the OT network 16 is performed by each network sensor 74. The network sensors 74 may further perform an inspection of the data acquired. According to one embodiment, the data correspond to a succession of data packets or data frames, subsequently called network data or network stream, and the analysis of the network data comprises the implementation of a deep packet inspection method. The network data acquired and inspected are transmitted by each network sensor 74 to the analyser 72.

In step 94, the analyser 72 distributes the network data according to one of the following categories:

1) network data relating to the operation of a machine 14 (block 96—R/W of variables);

2) network data corresponding to the management of the equipment 22, 24 of the OT network 16, in particular to the management of the controllers 22 (block 98);

3) network data relating to the configuration of a controller 22 (block 100); and 4) other data (block 102).

Category 1) network data corresponds in particular to:

a set point C transmitted to one of the controllers 22 via the communication network 26 of the OT network 16 and corresponding for example to a command to write data in a memory of the controller 22;

a machine command U transmitted by a controller 22 to the associated machine 14;

a machine output Y; or another data relating to the operation of the machines 14.

Category 2) network data corresponds in particular to a command to start a controller 22, to a command to shut down a controller 22, to a clock signal transmitted to a controller 22 or to a new gain value of a controller 22.

Category 3) network data corresponds in particular to the provision of a program to a controller 22 intended to be executed by the controller 22.

Category 4) network data corresponds to data that does not belong to categories 1), 2) or 3).

Step 94 may be implemented by using a transition table that is defined depending on the data transmission protocol used over the communication network 26 and that allocates to each network data one of the previous categories.

In step 104, the analyser 72 establishes a state of the industrial system 70 from data acquired in step 90. A state of the system is determined from a vector with N dimensions, where N corresponds to the number of variables $var_i$ used, i being an integer varying from 1 to N, and whereof the N components correspond to the values of the variables $var_i$ used. According to one embodiment, in addition to a monitored variable, the derivative of said variable may further be used. The derivative may be estimated by finite difference. The analyser 72 updates the values of the variables from the values provided by the network sensors 74. According to one embodiment, the variables from which is determined the state of the system comprise in particular the set of set points C of the controllers 22, the set of machine commands U provided to all of the machines 14 and the set of machine outputs Y of all of the machines 14. In the example of the system in FIG. 8, the state of the system is obtained from the vector with 6 dimensions (Tc, u, Q, Te, T, DT) where DT is the derivative of the temperature T.

In the industrial system 70 according to the invention, the analyser 72 may determine, for at least some of the variables, ranges of values from at least one first operational model of the machines.

For example, according to one embodiment, for each variable $var_i$, the set of values that may take the variable is divided into M groups of values $Z_{ij}$ for a symbolic variable or into M intervals of values $Z_{ij}$ for a numerical variable, where M is an integer greater than or equal to 1 and j is an integer that varies from 1 to M. In the remainder of the description, groups $Z_{ij}$ are referred to indifferently for a symbolic or numerical variable. The groups of values $Z_{ij}$ may be defined beforehand or by learning. Cluster Z #j, j varying from 1 to M, refers to the concatenation of the groups $Z_{ij}$ for i varying from 1 to N. In the example of the system in FIG. 8, the zone Z #0 may be the following {Z #0: [18.82; 19.22], 0, [12.55; 25.10], [12.55; 25.10], [12.55; 25.10], [−1.24; 0.02]}.

According to one embodiment, for each variable $var_i$, at least one of the groups of values $Z_{ij}$ and a degree of membership p to said group is allocated to the value acquired. According to one embodiment, the groups of values $Z_{ij}$ are distinct. The group of values $Z_{ij}$ to which the value of the variable $var_i$ belongs and the degree of membership $\mu_{ij}$ is equal to 1 may then be allocated to the variable $var_i$. According to another embodiment, the groups of values $Z_{ij}$ partially overlap. The groups of values $Z_{ij}$ to which the value of the variable $var_i$ belongs with degrees of membership $\mu_{ij}$ that are for example determined by fuzzy logic are then allocated to the variable $var_i$.

Figure 9:
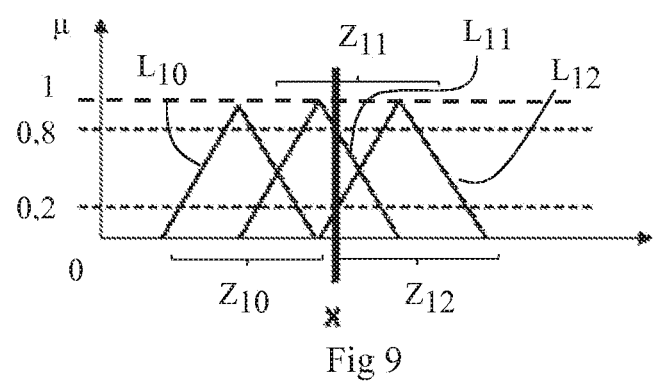
FIG. 9 illustrates a fuzzy logic method.

FIG. 9 is a graph showing the degree of membership p on the vertical axis and the values of a variable x on the horizontal axis and illustrates a fuzzy logic method. By way of example, three groups of values $Z_{10}$, $Z_{11}$ and $Z_{12}$ are shown that partially overlap. An allocation law $L_{10}$, $L_{11}$ and $L_{12}$ is provided for each group of values $Z_{10}$, $Z_{11}$ and $Z_{12}$, for example a law refines by pieces. The groups of values to which the value of the variable belongs with degrees of membership that depend on allocation laws are then allocated to the variable. By way of example, in FIG. 9, for the variable x, the degree of membership $\mu_{11}$ to the group $Z_{11}$ is equal to 0.8 and the degree of membership $\mu_{12}$ to the group $Z_{12}$ is equal to 0.2.

Generally, a variable $var_i$ may be represented by a list of degrees of membership $\mu_{ij}$ where j varies from 1 to M. The variable $var_i$ may then be represented in the following way $\{\mu_{i0}, \ldots, \mu_{ij}, \ldots, \mu_{iM}\}$, most of the degrees of membership being zero. A state of the system Z, subsequently called cluster Z, may correspond to the concatenation of the lists of degrees of membership of each variable $var_i$, i varying from 1 to N. In step 106, the analyser 72 determines a plurality of models of the industrial system 70, whereof in particular:

a first model M1 of the behaviour observed of the set points C sent by each computer system 24 depending on environment variables;

a second model M2 of the behaviour observed of each controller 22 depending on environment variables; and behaviour models of each machine 14, comprising a third model M3 of the behaviour observed and a fourth model M4 for predicting the behaviour of the machine 14.

Said models are continuously updated by learning techniques.

For the use of models, it is considered that the time passes discretely, which means that the modelling evolves by time step of duration Te. By way of example, it is noted the time with a discrete index: the instant t+1 means the instant t+1*Te.

The models M1, M2 and M3 are represented by a transition table that makes it possible to associate with a cluster Z existing at an instant t, noted Z(t), an active cluster at the next time step, noted Z(t+1). A plurality of models may be combined in a single transition table.

Figure 10:
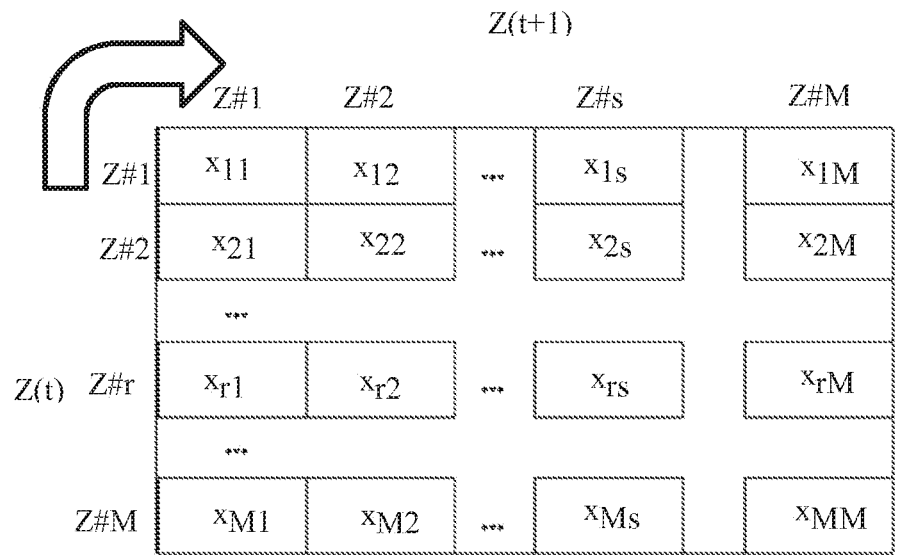
FIG. 10 shows an example of transition table.

FIG. 10 illustrates an example of transition table. According to this embodiment, each box of the transition table contains:

a number between 0 and 1 representing the percentage of times where a cluster $Z_r$ at t is followed by a cluster $Z_s$ at t+1. Said number is noted $x_{rs}$; and a distribution of the transition times with the percentage thereof, said times being greater than or equal to 0.

According to one embodiment, a method for determining the transition table is the following. A cluster Zprevious is used that is initially empty. The cluster Z #p associated with the values of the variables used is determined as previously described. If the cluster Z #p does not exist in the transition table, same is added to the transition table and the corresponding rows and columns of the transition table are initialised to 0. If the cluster Zprevious is not empty, the transition frequencies and the transition times towards the cluster Z #p are updated in the transition table. The cluster Zprevious is subsequently set equal to the cluster Z #p.

For the model M1, the environment variables are, for example, the hour, the day, the user number, the manufacturing order number, the operating mode (normal, manual, degraded, etc.). In the example of the system in FIG. 8, an environment variable may be the day/night indicator. For the models M2 and M3, the environment variables may be different. In the example of the system in FIG. 8, an environment variable for the models M2 and M3 may be the external temperature $T_{ext}$.

In the example of the system in FIG. 8, the models M2 and M3 may be combined in a single transition table. By considering, by way of example, the following clusters Z #5, Z #6, Z #7 and Z #8 {Z #5: [18.82; 19.22], 1, [12.55; 25.10], [37.65; 50.20], [12.55; 25.10], [−1.24; 0.02]}, {Z #6: [14.90; 15.29], 1, [12.55; 25.10], [37.65; 50.20], [12.55; 25.10], [−1.24; 0.02]}, {Z #7: [18.82; 19.22], 1, [12.55; 25.10], [50.20; 62.75], [12.55; 25.10], [−1.24; 0.02]} and {Z #8: [18.82; 19.22], 1, [12.55; 25.10], [50.20; 62.75], [12.55; 25.10], [0.02; 1.27]}, a section of the transition table may correspond to Table 1) below:

TABLE 1

| | transition table extract | | | |
|---|---|---|---|---|
| | Z#5 | Z#6 | Z#7 | Z#8 |
| Z#5 | 0.972<br>T = [0 1.00] | 0.014<br>T = [0 0] | 0.014<br>T = [1.00 1.00] | |
| Z#6 | 0.010<br>T = [0 0] | 0.99<br>T = [0 1.00] | | |
| Z#7 | | | 0.97<br>T = [0 1.00] | 0.031<br>T = [1.00 1.00] |

Said transition table means for example that the cluster Z #5 is followed by itself in 97.2% of cases after a time of 0 or 1 time unit, is followed by the cluster Z #6 in 1.4% of cases after a time of 0 time unit and is followed by the cluster Z #7 in 1.4% of cases after a time of 0 or 1 time unit.

From the transition matrix, it is possible to determine the evolution of the value of a variable. According to one embodiment, the determination of the evolution of the value of a variable $var_j$, where j is the index of the variable in the cluster, is performed as follows: the variable $var_j$ is represented by the degrees of membership $\mu_i$ thereof to the clusters Z #i, i varying from 1 to M, which is noted $var_j=(Z$ #i: $\mu_i$). The prediction of the new value of the variable, noted $var'_j$, is represented by $var'_j=(Z$ #i: $\mu_i'$) with $\mu_i'$ which is initialised to zero. For all of the clusters Z #i for which $\mu_i$ is different from zero and for all of the clusters Z #j of destination of the cluster Z #i, the coefficient $x_{ij}$ is read and $\mu_i*x_{ij}$ is added to the coefficient $\mu_j'$. In the example of the system in FIG. 8 with the fuzzy logic method illustrated in FIG. 9, for the variable T, with the extract of the transition table indicated previously, if an initial cluster {[18.82; 19.22]} is considered, a predicted value {0.020:[14.90; 15.29], 0.98:[18.82; 19.22]} is obtained.

For the prediction model M4, any type of extrapolation method can be used. By way of example, if it is considered h values of a first variable already determined at successive instants t−h+1, t−1 and t, where h is the integer corresponding to the past horizon of the extrapolation method, the predicted value of a second variable may be equal to a sum of the values of the first variable at instants t−h+1, t−1 and t multiplied by weighting coefficients and optionally of the sum of the values of the derivative of the first variable at instants t−h+1, t−1 and t multiplied by weighting coefficients. In the example of the system in FIG. 8, two prediction models can be used, a prediction model conveying the action of the flow rate Q on the temperature T and a prediction model conveying the action of the command u of the boiler on the temperature of the water Te. The past horizon of the extrapolation method is for example taken equal to 30.

Said models make it possible to predict the evolution of a variable over a future horizon given the inputs applied, outside of the evolutions observed. By way of example, in order to make a prediction ypred of a measurement Y over a future horizon of length L from a command U by using the matrix Pred containing the weighting coefficients of the extrapolation method, the prediction ypred is initialised with the value measured ymes at the instant t, a vector Uk equal to [duk(t); duk(t−1); duk(t−h+1); uk(t); uk(t−1); uk(t−h+1)] with duk(t) equal to uk(t)−u(k−1) is determined and it is repeated L times the operation consisting in allocating to the new predicted value, the sum of the last predicted value and of the period Pred(Uk).

In the industrial system 70 according to the invention, the analyser 72 may detect at least one anomaly having a likelihood, if the value of at least one variable is outside of the range of values of said variable.

For example, in step 108, the analyser 72 determines whether the state of the system has at least one anomaly. The models described previously make it possible, at each time step, to detect an abnormal behaviour. For this purpose, a "distance" between two clusters is determined. It is noted wi the component i of a cluster. The component wi is for example an integer representing an identifier of the symbol for the symbolic variables and an interval identifier for the numerical variables. By way of example, for the following cluster Z #0 {[18.82; 19.22], 0, [12.55; 25.10], [12.55; 25.10], [12.55; 25.10], [−1.24; 0.02]}, the values of the components wi of the cluster are 48, 0, 1, 1, 1 and 3, the number 48 corresponding to the identifier of the interval [18.82; 19.22], the numeral 1 corresponding to the identifier of the interval [12.55; 25.10] and the numeral 3 corresponding to the identifier of the interval [−1.24; 0.02].

According to one embodiment, the method for determining the distance D between the cluster Z #i and the cluster Z #j comprises the initialisation of D to 0 and, for all of the variables vk of the cluster, if vk is symbolic, the setting of dk to 1 if wj(Z #i) is different from wj(Z #j) and the setting of dk to 0 otherwise, and if vk is numerical the setting of dk equal to the absolute value of the difference between wj(Z #i) and wj(Z #j) and the determination of the new value of D equal to the maximum between the last value of D determined and dk. Such a method makes it possible to determine nearby clusters, for example at a distance less than a threshold dmax.

According to one embodiment, the method for detecting nearby clusters comprises the steps of:

a) initialising the cluster Zprevious to the zero value;

b) acquiring data and determining the cluster Zc as previously described;

c) finding in the transition table the cluster Zc. If the cluster Zc is found, we go to step d). If the cluster Zc is not found, it is searched in the transition table for a nearby cluster of the cluster Zc at a distance less than the threshold dmax. If the cluster is found, we go to step d). If a nearby cluster is not found, a red alert is emitted, which corresponds to an unrecognised situation and the method continues in step g). If the cluster Zprevious is at the zero value, the method continues in step f);

d) it is searched if the transition table contains a transition of the cluster Zprevious towards the cluster Zc. If this is not the case, an orange alert is emitted, which corresponds to an unrecognised behaviour. If the transition table effectively contains a transition of the cluster Zprevious towards the cluster Zc, the method continues in step f);

e) it is checked if the transition time is within the interval [Tmin, Tmax]. If this is the case, the method continues in step f). If the transition time is shorter than Tmin, a yellow alert is emitted corresponding to a dynamic that is too fast. If the transition time is longer than Tmax, a yellow alert is emitted corresponding to a dynamic that is too slow;

f) the cluster Zprevious is set equal to Zc. The method continues in step b); and g) a prediction of all of the measurements for which there is a prediction model is performed.

h) the values obtained with the transition table and the predicted values are propagated in the risk model in step 116 subsequently described in more detail. If the risk level is reached, a red alert corresponding to the risk level reached is emitted in step 118 subsequently described in more detail;

i) in the event of an abnormal situation, the cluster Zprevious is set equal to Zc and the method continues in step b).

The method comprises a learning phase that consists in using the models with evolution curves of the variables in the case of a normal behaviour of the corresponding industrial system.

In step 110, the analyser 72 detects whether the category 3) network data has been emitted correctly. According to one embodiment, the category 3) network data may be emitted by a computer system 24 controlled directly by a user via a human-machine interface. According to one embodiment, it may then be requested an identification of the user, for example by the request of a password, so that the computer system 24, controlled by the user, can emit category 3) network data. The analyser 72 may then be connected to the computer system 24 and receive a signal indicating that the user has entered a correct password.

According to one embodiment, it may be requested a double authentication of the user, for example by the request of a password and by the introduction of a key in a receptacle provided for this purposes on the computer system 24. The analyser 72 may then be connected to the computer system 24 and receive a confirmation signal when the double authentication has been performed successfully.

According to another embodiment, the computer system 24 may be controlled remotely by a user from a station 28 of the IT network 12. In this case, as previously described, the gateway 20 may implement a double authentication of the user and transmit to the analyser 72 a confirmation signal when the authentication has been performed successfully.

In step 112, the analyser 72 determines whether an anomaly called configuration anomaly has occurred. According to one embodiment, a configuration anomaly is detected if a category 3) network data is detected beyond the duration that follows the receipt of the confirmation signal when the single/double authentication has been performed successfully.

In step 114, for the category 4) network data, predefined blocking rules may be applied. Alternatively, step 114 may not be present.

In step 116, the analyser 72 evaluates a risk level depending on the anomaly or anomalies determined in steps 108 and 112.

In step 118, an alert may be emitted depending on the risk level determined in step 116.

In the industrial system 70 according to the invention, the analyser 72 may detect, from the anomaly or anomalies detected in step 108 and 112, at least one undesirable event, to which an impact having a severity is allocated. For example, according to one embodiment, the analyser 72 implements methods using fault trees that have been defined beforehand. A fault tree (also called failure tree) is a combination of possible events that make it possible to perform a predefined undesirable event.

Figure 11:
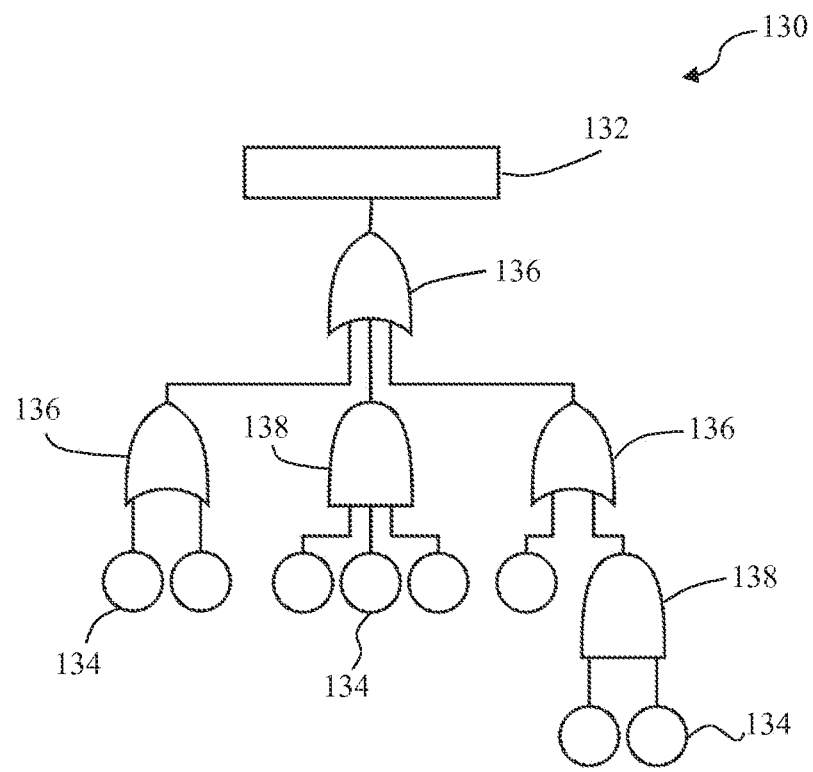
FIG. 11 shows an example of fault tree used during the implementation of the intrusion detection method illustrated in FIG. 7.

FIG. 11 is a graphic representation of a very simplified example of a fault tree 130. The top 132 of the tree only includes the final event whereof the aim is to describe how same may occur. An impact whereof the severity is quantified is allocated to said final event 132. The lines of the tree 130 show the combination or the combinations of basic events 134 likely to produce the final event 132. The combinations are represented by logical connections, generally logic gates "OR" 136 and logic gates "AND" 138. An example of final event 132 is the shutdown of a machine 14 or an overheating of a machine 14. A basic event 134 corresponds for example to the determination of a state anomaly, of a command anomaly, of a model anomaly, of a management anomaly and/or of a configuration anomaly by the analyser 72. A basic event 134 may further correspond to other types of alerts that are received by the analyser 72, for example an alert indicating that an access port of an item of equipment 22, 24 of the OT network 16 is not blocked or that the firewall of one of the computer systems 24 is configured incorrectly.

In the industrial system 70 according to the invention, the analyser 72 may determine, for each impact allocated to each of the at least one undesirable event, a likelihood, from a combination of likelihoods of anomalies determined by the analyser 72.

For example, the analyser 72 determines, for each impact, the likelihood of the impact from a combination of likelihoods of anomalies determined by the analyser 72 and likelihoods of alerts received by the analyser 72. The likelihood of the impact is a number varying from 0 to 1. By combining said likelihood with the severity of the impact, determined during the risk analysis, the analyser 72 provides an indication of the risk level, for example by using a risk matrix.

In the industrial system 70 according to the invention, the analyser 72 may provide, for each impact and the severity-likelihood combination thereof, a numerical value. Also, the analyser 72 may determine an overall risk level of the industrial system from the numerical values obtained of the impacts of the at least one undesirable event detected.

For example, a risk matrix may be used as indicated above. The risk matrix is a matrix whereof the rows are organised according to the likelihood of occurrence, that is to say the probability of occurrence, of the impact, for example from the most probable to the least probable, and whereof the columns are organised according to the weighted severity of the impact and that provides a numerical value for each severity-likelihood combination. The overall risk level is determined from the numerical values obtained of the impacts detected, for example by determining the maximum or the mean of the numerical values.

An example of risk matrix corresponds to the following table 2).

TABLE 2

| | | Risk matrix | | | | |
|---|---|---|---|---|---|---|
| | | Impact | | | | |
| | | Insig-nificant | Minor | Moderate | Major | Cata-strophic |
| Like-lihood | Almost certain Probability 1 out of 10 | H-40 | H-48 | E-72 | E-84 | E-100 |
| | Probable Probability 1 out of 100 | M-24 | H-44 | H-56 | E-80 | E-96 |
| | Possible Probability 1 out of 1000 | L-12 | M-28 | H-52 | E-76 | E-92 |

TABLE 2-continued

| | Risk matrix | | | | |
|---|---|---|---|---|---|
| | Impact | | | | |
| | Insig-nificant | Minor | Moderate | Major | Cata-strophic |
| Improbable Probability 1 out of 10000 | L-8 | L-20 | M-36 | H-64 | E-88 |
| Rare Probability 1 out of 100000 | L-4 | L-16 | M-32 | H-60 | H-68 |

In Table 2), the letters E, H, M and L have the following significance. The letter E means an extreme risk, corresponding to a numerical value between 70 and 100, which requires for example an immediate response. The letter H means a high risk, corresponding to a numerical value between 40 and 70, which requires for example a priority response. The letter M means a moderate risk, corresponding to a numerical value between 21 and 39, which requires for example a planned response. The letter L means a low risk, corresponding to a numerical value between 0 and 20, which requires for example a response planned within the routine procedures.

Figure 12:
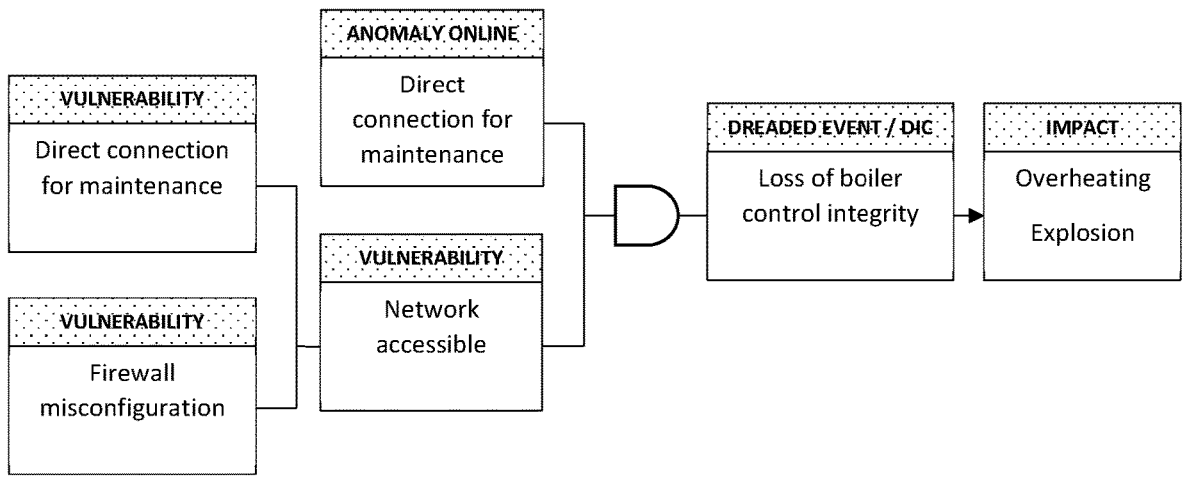
FIGS. 12 and 13 are examples of fault trees used during the implementation of the intrusion detection method of the industrial system shown in FIG. 8.

FIG. 12 illustrates a first example of fault tree for the system in FIG. 8 corresponding to an overheating of the boiler 85. The severity of the impact is in this case catastrophic.

Figure 13:
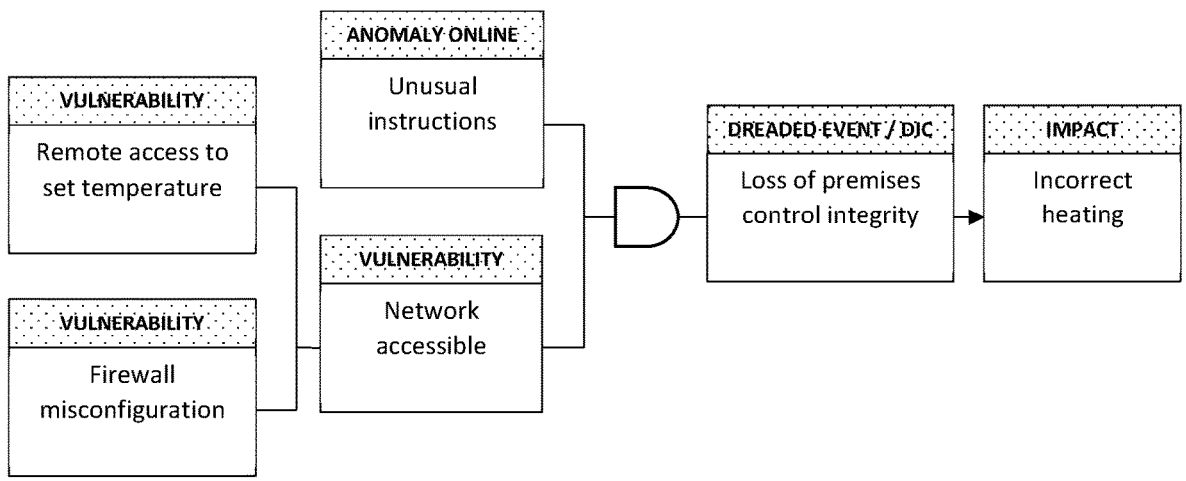

FIG. 13 illustrates a second example of fault tree for the system in FIG. 8 corresponding to incorrect heating of the enclosure 89. The severity of the impact is in this case moderate.

The risk analysis makes it possible to determine conditions to be respected for certain variables of the industrial system. For the system in FIG. 8, a condition may be that the temperature Te must remain below 90° C. to guarantee an operation in complete safety. Another condition may be that the temperature T must remain between 15° C. and 30° C. to guarantee an operation of correct quality.

For the system in FIG. 8, examples of attacks are the following:

network attacks on the set point Tc consisting, for example, in setting the set point Tc at a value higher than in normal operation or setting the set point Tc to zero;

attacks on the commands u and Q consisting, for example, in setting the command u to zero, in using a values unusually, in setting the flow rate Q to the maximum in order to attempt to degrade the industrial system, or in setting the heating command u to the maximum in order to attempt to degrade the industrial system;

attacks on the measurements Te and T consisting, for example, in distorting the water temperature Te measurement in order to degrade the industrial system, the temperature Te being for example maintained fixed at 79° C. as soon as same exceeds 79° C. or in distorting the temperature T measurement in order to degrade the industrial system, the temperature T being for example maintained fixed at 16° C. as soon as same exceeds 18° C.;

attacks against the controller 22, consisting for example in preventing same from transmitting commands; and derivative attacks of the industrial system, consisting for example in reducing the external temperature Text, or in reducing the heating efficiency of the boiler.

Again by considering FIG. 7, in step 118, the analyser 72 carries out an action depending on the risk level determined in step 116. According to one embodiment, the analyser 72 emits a message, for example by means of the human-machine interface 84, indicating the risk level determined. According to another embodiment, the analyser 72 may order the shutdown of a machine 14.

According to one embodiment, the gateway 20 is configured to perform a classification of the network data in the same way as described in step 94. The gateway 20 may determine by learning a statistical model from the succession of network data or from data read or write orders in the memory 36, for example in the form of a transition table as previously described, the inputs of the rows and columns being the network data, the transition table being constructed as previously described. According to one embodiment, the learning comprises the determination of a prediction model for predicting the expected sequence of network data or of data read or write orders in the memory 36 as previously described.

The gateway 20 may emit an alert if the deviation between the instant of detection of the last network data or of a read or write order in the memory 36 and the instant provided by the model is greater than a given threshold.

Particular embodiments have been described. Various variants and modifications will become apparent to the person skilled in the art. Particularly, although in the embodiment described previously in relation with FIG. 5, the analyser 72 is a distinct element of the gateway 20, the analyser 72 may be combined with the gateway 20. Furthermore, various embodiments with various variants have been described above. It is noted that various elements of said various embodiments and variants may be combined. Furthermore, although in the embodiments described previously, the method for learning the behaviour of the industrial system has been described in the case of an intrusion detection method in an industrial system, it is clear that such a learning method may be implemented for applications other than the intrusion detection in an industrial system. According to one example, the learning model may be used to predict the energy consumption of a system. If the algorithm is used at the same time on a plurality of methods, same may make it possible to optimise the operating sequence of the various methods in order to smooth and optimise the energy consumption. According to another example, if the model presented is used for a method for controlling the heating of a building, it may, furthermore, make it possible for a method to predict the occupation of the building from the consumption model learned.

The invention claimed is:

1. An industrial system comprising machines, controllers for controlling machines connected by a first communication network and a gateway connecting the first communication network to a second communication network, the gateway comprising a memory and comprising a processor configured to:
copy to the memory first data transmitted to the second communication network and relating to the operation of the machines,
perform authentication of a user of a station connected to the second communication network, and
in response to a successful authentication, allow the station to read data stored in the memory of the gateway or to write data to the memory of the gateway without giving the station direct access to the machines,
the industrial system further comprising an analyser, configured to:
collect values of variables relating to the operation of the machines,
determine, for at least some of the variables, ranges of values from at least one first operational model of the machines,
detect at least one anomaly, if the value of at least one variable is outside of the range of values of said variable, said anomaly having a likelihood,
detect, from the at least one anomaly, at least one undesirable event, to which is allocated an impact on the industrial system, said impact having a severity,
determine, for each impact allocated to each of the at least one undesirable event, a likelihood, from a combination of likelihoods of the at least one anomaly detected,
provide, for each impact and the severity-likelihood combination thereof, a numerical value, and
determine an overall risk level of the industrial system from the numerical values obtained of the impacts of the at least one undesirable event detected.

2. The industrial system according to claim 1, wherein the first data are provided by the controllers.

3. The industrial system according to claim 1, wherein the processor is configured to write in the memory second data provided by the station connected to the second communication network.

4. The industrial system according to claim 3, wherein the processor is configured to transmit to at least one of the controllers the second data written in the memory.

5. The industrial system according to claim 3, wherein the authentication of the user of said station comprises implementing two distinct identification methods.

6. The industrial system according to claim 1, comprising at least one network sensor configured to make a copy of third data circulating over the first communication network and connected to the analyser.

7. The industrial system according to claim 6, wherein the analyser is configured to receive the third data, in order to classify the third data according to at least first and second categories, and in order to determine at least the first operational model from the third data of the first category and a second operational model from the third data of the second category.

* * * * *